Nov. 29, 1960   E. T. LINDEROTH   2,962,122
DUST SEPARATOR
Original Filed Sept. 14, 1955   3 Sheets-Sheet 1

INVENTOR
ERIK TORVALD LINDEROTH
BY
Buckhorn and Cheatham
ATTORNEYS

INVENTOR
ERIK TORVALD LINDEROTH

2,962,122
DUST SEPARATOR

Erik Torvald Linderoth, Stockholm, Sweden, assignor to Aktiebolaget Linderoths Patenter, Stockholm, Sweden, a corporation of Sweden Original application Sept. 14, 1955, Ser. No. 534,219. Divided and this application Apr. 11, 1958, Ser. No. 730,041

5 Claims. (Cl. 183—79)

The present application is a division of my co-pending application, Serial No. 534,219, filed September 14, 1955, entitled Dust Separator and now abandoned.

The present invention relates to dust separators, and more particularly, the invention contemplates an improvement in dust separators of the type in which a stream of the gaseous medium to be purified is impelled at a high velocity and through an acute angle towards a filter surface provided with gas passages, in such manner that the gas is divided into two secondary streams one of which passes through the filter surface carrying a reduced amount of solid particles and the other of which is enriched in solid particles and flows along the filter surface to a dust outlet usually communicating with a secondary dust separator associated with a receptacle to collect the dust. In dust separators of the type which the present invention aims at improving, the material of the filter surface situated between the passages is shaped so as to reflect dust particles impinging upon the filter surface to cause them to return into the secondary stream flowing along the filter surface.

In this type of dust separators the filter surface is usually made from a metallic material and is usually given the shape of a tapered duct, e.g. a conical tube, through which the gas flows from the wider end towards the narrower end thereof, the purified gas departing progressively through the passages of the filter surface, while the secondary stream enriched in particles leaves through the narrow end of the tapered duct.

It is also known to position the filter surface in a tapering duct of an arbitrary cross section, said duct being made from a metallic material. A satisfactory embodiment of this type is a tapered filter surface surrounded by a tapered shell, the dust-carrying gas to be purified being supplied to the wider end of the two tapered members and introduced into the space between the filter surface and the surrounding tapered shell.

A second embodiment used in practice comprises a flat filter surface towards which the gas stream is directed in an acute angle by a flat guiding surface, or two opposed flat filter surfaces forming a duct which tapers in the direction of flow.

While such dust separators are primarily intended to separate relatively fine dust, in practice it will often happen that coarser particles accompany the fine dust. If the coarse particles consist of a hard material, e.g. sand grains accompanying sand dust, metal chips in grinding dust, flying coke in flying cinders etc., it has been found that such particles by rebounding from the filter surface or the above shells or guiding surfaces will be hurled back so forcibly that on renewed impingement on the filter surface they strike thereat through such an acute angle that they pass through the filter passages.

This involves a disadvantage insofar as a dust separator capable of separating a relatively fine dust should not allow coarse particles to pass through it.

The present invention has for its object to eliminate this disadvantage. The invention contemplates covering the filter surfaces and/or the guiding surfaces or the inlet casings with a soft plastic, soft rubber or similar material, whereby a considerable proportion of the power of impact of the particles will be absorbed, whereby they are not thrown back so forcibly as on an impingement against a hard metallic surface.

Soft plastics and certain grades of soft rubber have been found to have to a large extent the property of reverting after a deformation to their initial shape at a relatively slow rate. By suitably balancing the plastic and resilient properties of the filter surface material the result can be obtained that the cushioning effect will predominantly affect the heavier particles, which deform the filter surface when impinging thereagainst. Examples of materials which can be used in accordance with the present invention to form the filter surfaces, include polyethylene, polyvinyl alcohol, plasticized polyvinyl chloride, copolymer of vinyl chloride and vinylidene chloride, natural rubber, various types of synthetic rubbers, such as GR–S, butyl rubber, polychloroprene and the like.

The effect to be achieved by the present invention is particularly marked if the filter surface is made entirely of plastic or soft rubber, the material between the filter passages being present in the form of ribs which are so thin that they are deflected by the impingement of the heavier particles. Suitably the filter surface may comprise strands, ribbons, strips or cords of plastic or soft rubber mounted on frames or grids of a different material.

The material in the ribs or strands should preferably be thinner than the size of the coarsest particles to be separated and at least ten times the size of the finest particles which can be separated efficiently. Preferably, the ribs or cords are of a thickness between 3 and 0.1 mm.

By selecting a suitable ratio of the free length to thickness of said ribs it is possible, in addition to the cushioning effect, to obtain the effect that the ribs are imparted vibration by the gas flow, whereby the finest portion of the dust, which is usually adherent, will be effectively prevented from adhering to the filter surfaces. Thereby, it will be possible to use a closer spacing between the ribs (narrower filter passages) than was possible hitherto in view of the risk of clogging. This results in an enhanced degree of separation even of the finest dust, the separation of which depends on the rapid deflections undergone by the gas flow when streaming around the ribs before passing through the filter openings. The invention is primarily intended to be employed in connection with the type of filter where the ribs between the filter passages shall be of such a shape that they reflect the gas stream at a steep angle so that a stationary wave is generated at each rib in the gas stream flowing along the filter surface, similar to the standing waves which can be observed when a shallow stream of water flows at a great velocity over an uneven bottom. On particles of such a size that they partake, with a certain phase displacement, in said wave movement an aerodynamic force will be induced which is directed from the filter surface. How such a force is induced is described in detail in U.S. Patent No. 2,506,273. The ideas expressed in said patent can be realized to better advantage by utilizing the present invention. It is possible without danger of passage of coarse particles to utilize great angles of attack on the rib surfaces facing the air stream and it is also possible to utilize a close spacing of the ribs without danger of clogging.

Thereby, a high frequency and a great amplitude of the wave in the gas stream adjacent the filter surface can be achieved.

According to the above patent the frequency of the waves shall be at least 1000 cycles per second, suitably between 2000 and 4000 cycles per second or more. The frequency is determined by the velocity of flow and the spacing of the ribs. The upper limit to the velocity of flow is determined by the permissible power expenditure, and hitherto it has not been possible to reduce the spacing below a level determined by the danger of clogging. There is another factor which has restricted development towards a close spacing, namely the wear of the filter surface by eroding dust. In this respect, too, the present invention involves an advantage since certain grades of the materials herein contemplated have an abrasion resistance many times that of iron and steel, which have hitherto been used in the filter surfaces referred to. Thus, a combination of a vibrating filter surface and said abrasion resistant materials permits the practical use of aerodynamic filters having a very close spacing and thereby high efficiency. This inventive idea is also applicable when the filter surface is vibrated by mechanical means. A filter surface imparted vibrations by the air flow, however, represents a simpler solution.

Particles so fine that they substantially accompany the air stream in its deflection in front of the obstacles formed by said ribs will, if they collide with these obstacle, impinge against them under a very acute angle or approximately tangentially. To separate those fine particles it is important that as rapidly as possible after contact with the filter surface they leave the layer of flow adjacent to that surface, the so-called frictional boundary layer, else there is a danger that the particle will be carried by said layer of flow through the successive filter passage. Due to the small angles of impingement of these particles and their highly reduced velocity in the frictional boundary layer the repulsive effect will be insignificant. If the impingement surfaces are made from a soft plastic or a soft rubber, however, which material exhibits a high coefficient of friction, particles which move tangentially to the impingement surfaces will be imparted a rotating movement and this even when the particle configuration deviates essentially from the spherical. Simultaneously the particle will be blown from behind due to the fact that it has been decelerated by its impingement on the filter surface, and to the fact that after impingement it is repelled into layers flowing at a higher velocity. This blowing action in conjunction with the rotation produces, in accordance with the Magnus effect, an aerodynamic force acting on the particle in a direction away from the filter surface, and this force aids in moving the particle out of the frictional boundary layer.

The invention is illustrated but not limited by the associated drawings, in which:

Fig. 2 shows a fragmentary view in perspective of a filter comprising a guide surface for the air stream, said guide surface having a lining of the yielding material referred to;

Figure 1:
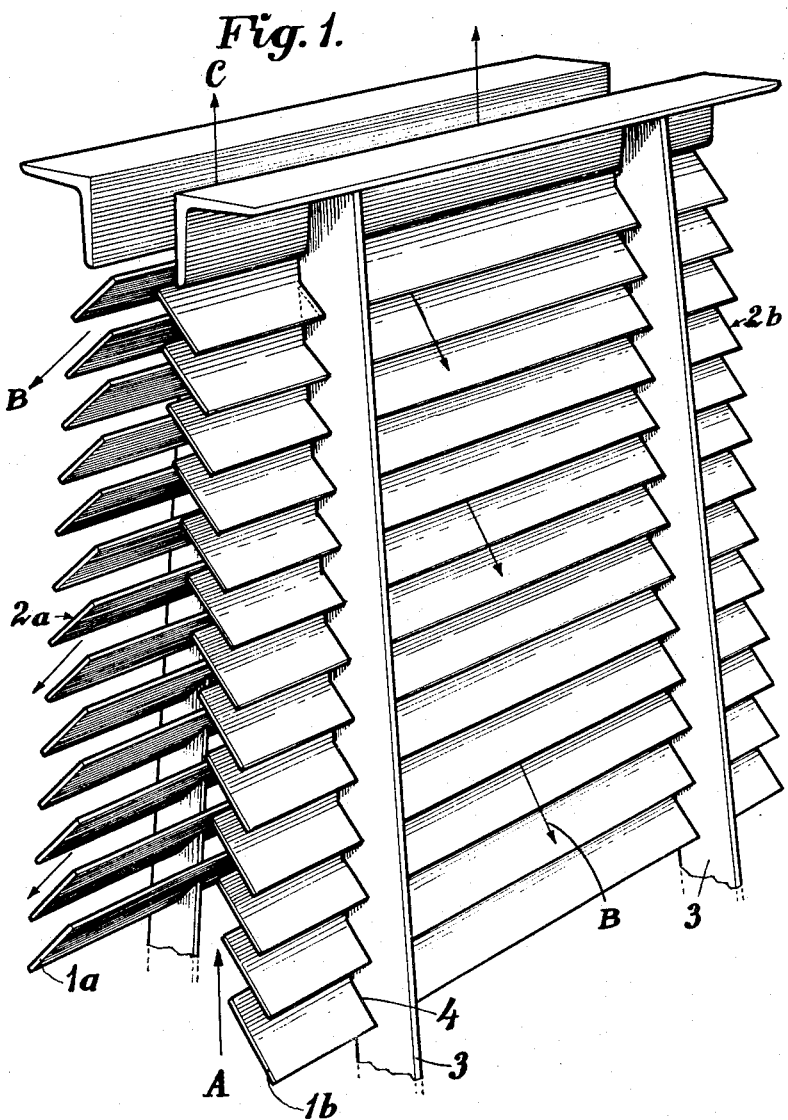
Fig. 1 shows a fragmentary view in perspective of a filter in which the filter surface comprises strips of a yielding material such as described above mounted on a frame.

Referring to Fig. 1 the numerals 1a and 1b designate strips of a soft plastic or a soft rubber disposed so as to form two opposed curtain-like grids 2a and 2b which define a tapered duct for the gas to be purified. In this duct, there flows at a high velocity in the direction A the gas to be purified. The purified gas departs between strips 1a and 1b in the direction B. The separated dust is withdrawn at C together with an amount of air sufficient to maintain a high velocity of gas flow along the entire length of filter surface unto the dust outlet. The strips 1a and 1b are arranged with their longitudinal direction transverse to the gas stream A and are maintained in their predetermined positions by ribs 3 of a rigid material positioned with their longitudinal direction substantially parallel to the gas stream A, i.e. transversely across the strips 1a and 1b, which are fitted in notches 4 in the ribs 3.

Figure 2:
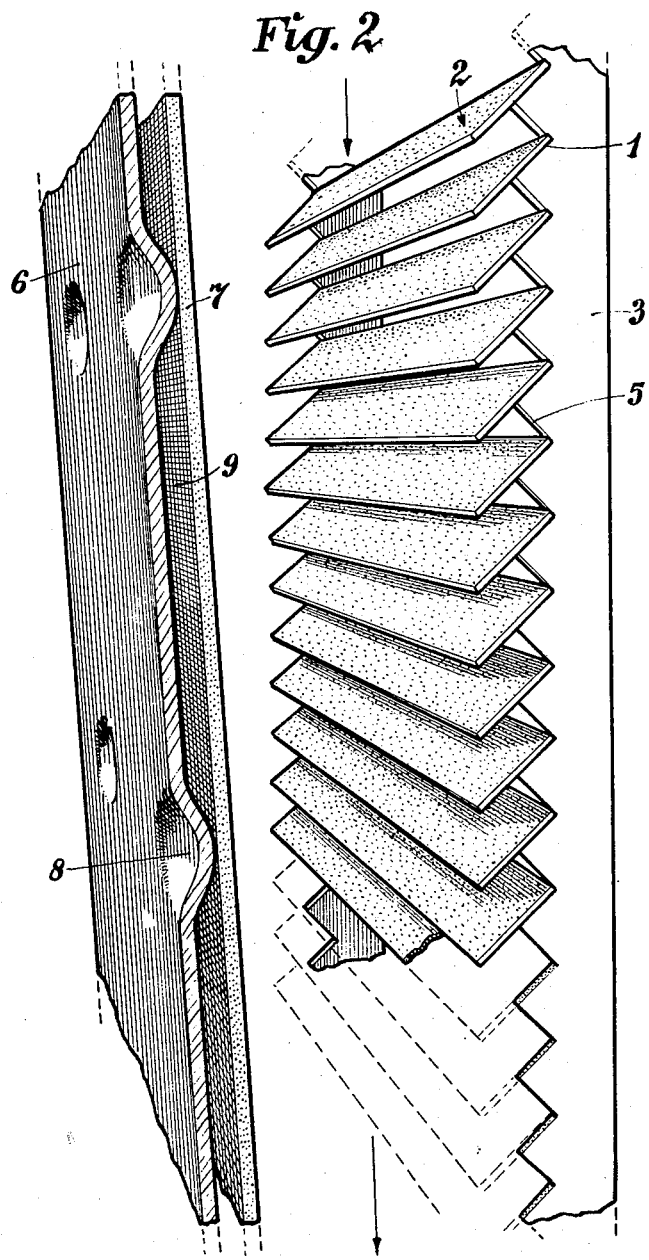

In Fig. 2, the numeral 2 designates a filter surface composed of elastic strips 1, wherein, unlike Fig. 1, the strips are not fitted in notches in the supporting ribs 3, but are adhesively joined thereto. The edge of the supporting ribs turned towards the grid has serrated projections 5 to keep the strips positioned. A guiding surface 6 directs the gas to be purified towards the filter surface. On the side of the guiding surface 6 facing the filter surface (grid), it is provided with a lining 7 of a yielding material, such as a soft plastic or a soft rubber which forms the actual guiding sheet. In Fig. 2, the inner surface of such guiding sheet facing the filter frame is substantially planar and the edges of the strips or slats facing the guiding sheet are positioned in a plane.

The lining 7 is preferably arranged so that a space 9 is formed between the lining and the guiding surface whereby the cushioning effect is materially increased. This space is formed by providing the material in the guiding surface with a suitable number of depressions, 8, but can be provided in any other manner, e.g. by means of spacers or lugs. An intermediate layer of an extra soft foamed rubber or foamed plastic has a similar effect, although a lining of a suitable thickness, e.g. 0.5 to 3 mms. and arranged as freely as possible will generally be found most satisfactory.

By arranging a yielding material in the manner described above on the guiding surface as well as the filter surface there is obtained a cushioning effect, which is substantially greater than the sum of the cushioning effects each of these devices would have separately. It has been found that, as a rule, at least two repercussions are required to enable a particle to penetrate the filter surface namely, firstly a repercussion against a rib of the filter surface, which hurls the particle at such an acute angle to the guiding surface that this repels the particle back towards the filter surface in a direction such that the particle will be carried by the purified gas through the filter openings. The conserved kinetic energy following two repercussions will then be equal to the square of the kinetic energy of the particle following one repercussion expressed in percent of the particle kinetic energy prior to the first repercussion. (To be exactly valid this presupposes that the particle will not lose or be imparted energy between the repercussions.) Suppose e.g. that a material absorbs 35% of the impact energy and a second material 11%; then after two impingements the conserved energy will be 12% in the first case, but only 1.2% in the second case.

There are cases, however, when it may be sufficient to coat only the guiding surface with a yielding material to eliminate practically completely the passage of coarse matter. One such case is a filter type in which a curved filter surface is surrounded by a similarly curved guiding surface in order that coarse particles shall be removed from the filter surface by the centrifugal action. Experience has proved that this object cannot be achieved completely, however, particularly in the portion of the filter adjacent the dust outlet where the spacing between the filter surface and the guiding surface is close. There, coarser particles will rebound back towards the filter surface.

Figure 3:
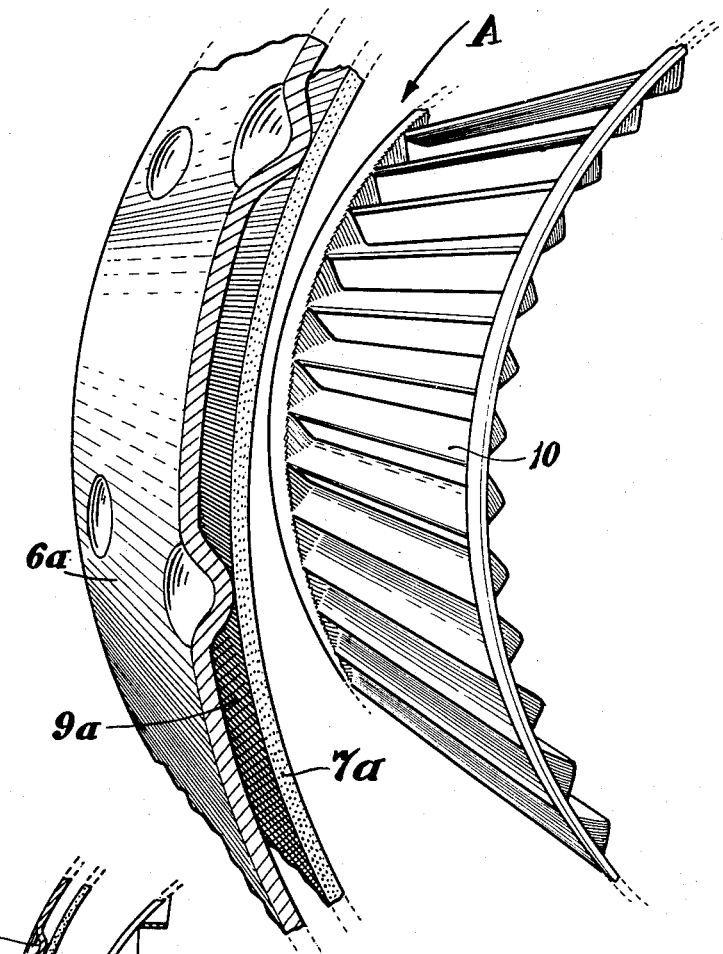
Fig. 3 shows a fragmentary view in perspective of a filter including a curved filter surface surrounded by a curved guiding surface.
Figure 4:
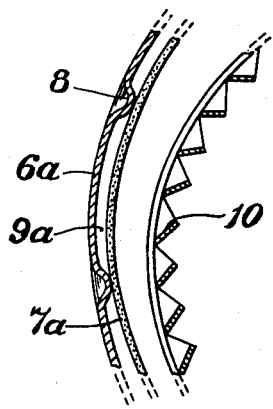
Fig. 4 is a fragmentary cross section on a smaller scale of the filter of Fig. 3.

Fig. 3 shows a fragment of a filter of this type, in which the numeral 10 represents the filter surface, usually consisting of a perforated metal sheet, and 6a represents the guiding surface which has a lining 7a of the type above described, arranged spaced from the inside of the curved guiding surface as seen at 9a.

Fig. 3 could also represent a fragmentary section of a filter of a type in which a conical or cylindrical filter surface is surrounded by a conical or cylindrical casing which forms a guiding surface for the gas to be purified which flows along a helical path in the space between the filter surface and the casing, as described e.g. in the U.S. Patent No. 2,571,331.

Without departing from the scope of the invention, it is possible to construct solely the portion of the filter adjacent the dust outlet in the manner described above, i.e. with the filter surface or the guiding surface or both consisting of or coated with a yielding material.

Having now particularly described the nature of my invention and the manner of its operation what I claim is:

1. A dust separator comprising a pair of frames converging towards each other at an acute angle, but not meeting, to define a gas passage having a wide entry opening, and a narrow exit opening whereby a stream of gas flowing through the entry opening and between the frames toward the exit opening flows at a high velocity, one of said frames comprising a filter frame having a plurality of parallel, gas escape passages therethrough, said gas escape passages being narrow slots extending transversely to the direction of flow of the gas between the frames, said gas escape passages being defined by a plurality of slats each inclined rearwardly with respect to direction of gas flow between the frames, the other of said frames comprising a rigid, imperforate guiding sheet the inner side of which, facing the filter frame, is provided with an imperforate cover sheet spaced from said rigid guiding element and supported thereby at a plurality of spaced points intermediate the area of said cover sheet and formed of a yielding and resilient material, whereby the kinetic energy of heavier solid particles entrained with the stream of gas is essentially absorbed upon impact with the yielding and resilient cover sheet to prevent heavier particles from rebounding across the gas passage and impinging on the filter frame at such a large angle that they escape through the gas escape passages in the filter frame.

2. The construction set forth in claim 1 wherein said guiding sheet is provided with a plurality of slight projections of small surface area against which said cover sheet rests in slightly spaced relation thereto.

3. The construction set forth in claim 1 wherein said cover sheet has a thickness in the order of 0.5 to 3 mms. and the spacing of said cover sheet from said guiding sheet is in substantially the same order.

4. The construction set forth in claim 1 wherein said inner side of said guiding sheet is substantially planar and the edges of said slats facing said guiding sheet are positioned substantially in a plane.

5. The construction set forth in claim 1 wherein each of said frames is curved in the same direction, and said filter frame is radially inward of said other frame.

References Cited in the file of this patent

UNITED STATES PATENTS

| | | |
|---|---|---|
| 2,076,815 | Fulweiler | Apr. 13, 1937 |
| 2,115,134 | Andersen | Apr. 26, 1938 |
| 2,591,408 | Crankshaw | Apr. 1, 1952 |

FOREIGN PATENTS

| | | |
|---|---|---|
| 184,282 | Switzerland | Aug. 1, 1938 |
| 284,790 | Switzerland | Dec. 1, 1952 |